(No Model.)
A. LESLIE.
ATOMIZER.
No. 461,349. Patented Oct. 13, 1891.
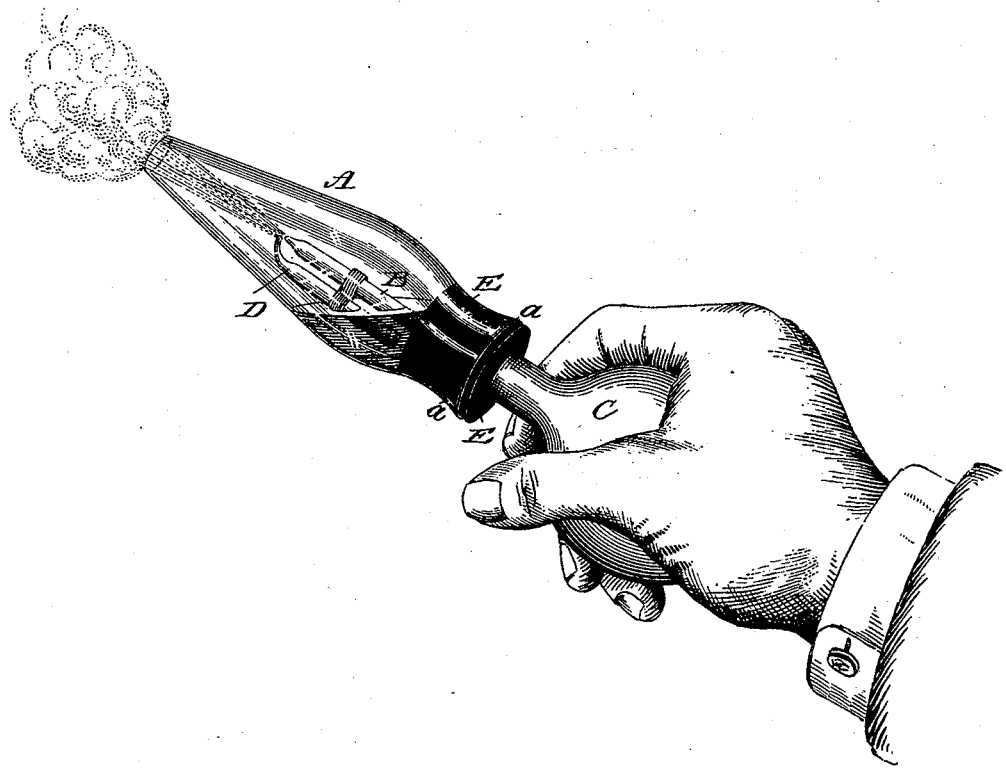
Witnesses
L. C. Hills.
Avella Dick
Inventor
Andrew Leslie
by Marcellus Bailey
his Attorney

UNITED STATES PATENT OFFICE.

ANDREW LESLIE, OF ST. LOUIS, MISSOURI, ASSIGNOR TO THE A. M. LESLIE SURGICAL INSTRUMENT COMPANY, OF SAME PLACE.

ATOMIZER.

SPECIFICATION forming part of Letters Patent No. 461,349, dated October 13, 1891.

Application filed November 15, 1890. Serial No. 371,502. (No model.)

*To all whom it may concern:*

Be it known that I, ANDREW LESLIE, of the city of St. Louis, in the State of Missouri, have invented a new and useful Improvement in Atomizers, of which the following is a specification.

The atomizer in which my invention is contained comprises a glass shield, an atomizing-tube within the shield, and a rubber bulb for operating the atomizing-tube. The invention is directed to means for holding together these parts. The simplest means consists of a rubber stopper filling the neck of the glass shield and having attached to or inserted in it at one end the atomizing-tube and at the other end the nozzle of the rubber bulb. With such a stopper, however, great difficulty is experienced in holding together the parts when vaseline, cosmoline, or other oily substances to be atomized are used. These substances, which are placed in the shield, find their way between the shield and the rubber stopper and permit the parts to slip apart with ease, no matter how tightly they may be originally fitted together. This defect I remedy completely by contracting the central portion of the stopper and similarly forming the neck of the glass shield, so that when the stopper is inserted in place its contracted central portion will fill the contracted portion of the neck of the shield, while its gradually-expanding or enlarged end will fill the like portion of the neck. Without the employment of this or some equivalent form I have found that the parts cannot be held together when substances such as above named are used in the atomizer. By its employment I make an efficient instrument of otherwise practically useless parts.

To enable others skilled in the art to make and use my improvement, I shall now proceed to describe it more particularly by reference to the accompanying drawing, which represents in perspective an atomizer embodying my invention.

In the drawing, A is the glass shield. B is the atomizing-tube. C is the rubber bulb for operating the same. D is the tube or nozzle through which the liquid to be atomized is drawn as usual by the action of the air-jet issuing from tube B, and E is the rubber stopper.

The atomizing-tube B and the rubber bulb C are inserted and held in the rubber stopper, and are arranged to operate together in the usual way. The tube D is supported in place by being attached to the atomizing-tube B by any suitable fastening, and its open rear end enters the liquid to be atomized, which liquid, as shown, is contained in the glass shield A, which serves as a reservoir. The rubber stopper has a contracted central portion, and it thence gradually expands toward each end. The neck *a* of the glass shield, in which the stopper is inserted, is similarly shaped, the result being that when the stopper is inserted and forced home in place in the neck its enlarged ends, fitting as they do closely against the expanded end portions of the neck, the glass shield is held firmly and immovably in place, no matter what liquid substance is put into it.

Having described my improvement, what I claim herein as new, and desire to secure by Letters Patent, is—

An atomizer comprising a glass shield provided with a neck having enlargements therein, and a rubber stopper carrying the atomizing-tube and rubber bulb and formed with contracted and enlarged portions to fit the corresponding portions of said neck, into which it is inserted, as and for the purpose hereinbefore set forth.

In testimony whereof I affix my signature in presence of two witnesses.

ANDREW LESLIE.

Witnesses:
HERMAN OVERSTOLZ,
J. W. MOORE.